Figure 1:
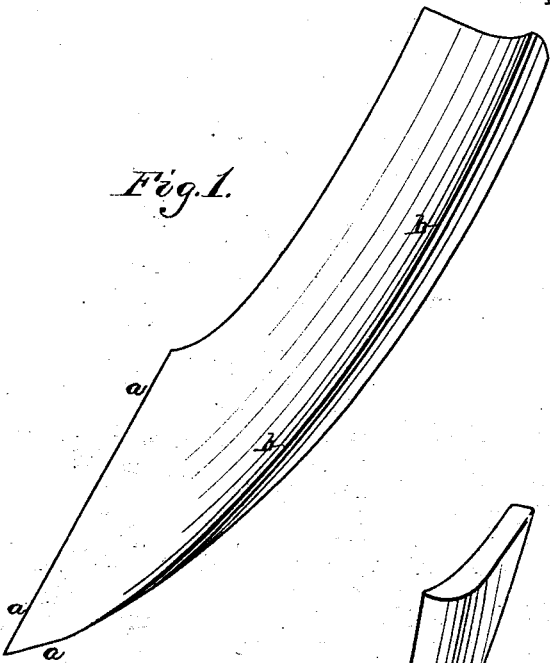
Figure 2:
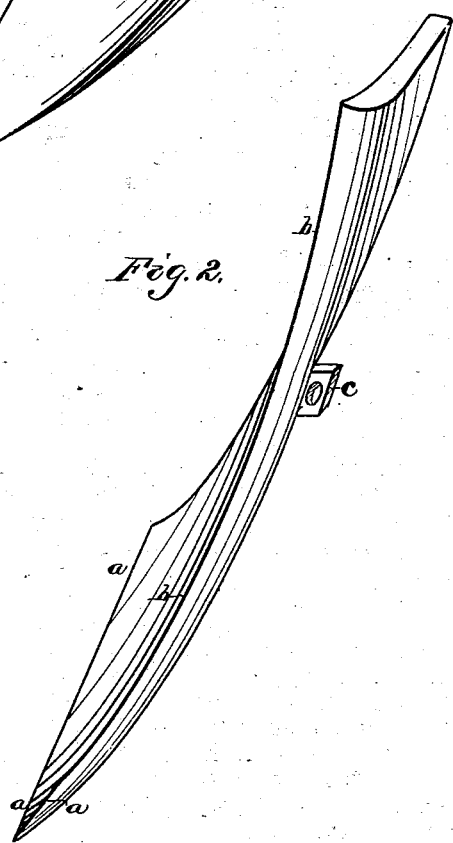

(Model.)

H. N. TIMMS.
CULTIVATOR SHOVEL.

No. 275,546. Patented Apr. 10, 1883.

Witnesses.
Henry Frankfurter;
Plinty B. Smith.

Inventor.
Harvey N. Timms
per: Dixon & Smith,
Attorneys.

UNITED STATES PATENT OFFICE.

HARVEY N. TIMMS, OF KENT, ASSIGNOR OF ONE-HALF TO BENJAMIN F. TIMMS, OF LENA, ILLINOIS.

CULTIVATOR-SHOVEL.

SPECIFICATION forming part of Letters Patent No. 275,546, dated April 10, 1883.

Application filed March 28, 1881. (Model.)

*To all whom it may concern:*

Be it known that I, HARVEY N. TIMMS, of Kent, in the county of Stephenson and State of Illinois, have invented a certain new and Improved Cultivator-Shovel; and I do hereby declare the following to be a full, clear, and exact description of the same, reference being had to the accompanying drawings, forming part of this specification, in which the two figures represent perspective views of my improved shovel in different positions.

Similar letters indicate like parts in both figures.

My invention relates to that class of shovels used upon what are generally known as "shovel-plows" and the various kinds of cultivators more particularly designed for the cultivation of young and growing corn; and it consists of a shovel having its blade slightly curved in the direction of its length, and having a pointed lower end, and tapered in an easy curve to a forwardly-projecting cutting-edge at one side, all as I will now proceed to describe.

The figures of the drawings show a shovel in which *a a* are the cutting-edges at the bottom of the shovel, and which work in the ground. The shovel is curved slightly in the direction of its length, as shown, and at the side next to the plant is curved forward and reduced to a cutting-edge, *b*, extending along the extire side of the shovel, as shown. The side of the shovel should not be curved so far that its line of projection will be at right angles to the main portion of the shovel, as in that case the shovel would have invariably to be attached to the plow at right angles to the line of its advance.

The shovel may be attached to the plow or cultivator by any suitable attachment, as shown at *c*.

In using my shovel it may be operated in close proximity to the plant, and the edge will cut instead of tearing the earth, thus avoiding the disturbing of the plant, while the earth is thrown away from the plant, this result being greatly promoted by the rearward slope of the shovel.

I am aware that cultivator-shovels have been made which are provided with a flange upon one of their sides; but the flange has projected from the shovel at right angles threeto, rendering it necessary that the shovel should be adjusted upon the plow in a position at right angles to the line of its advance, and the flange in this position would not form part of the face of the shovel.

I am also aware that cultivator-shovels have been made with one portion of the shovel bent forward at an angle to the remaining portion; but a shovel so made is liable to clog and not scour freely, while in my shovel the side, being curved forward, but not to such a degree that its line of projection is at right angles to the main portion of the shovel, does not form a flange, and there is no angle with the face of the shovel, so that the shovel can be adjusted at any desired angle to the line of the plow's advance, and will scour freely.

I claim as my invention—

The herein-described cultivator-shovel consisting of the blade curved slightly in the direction of its length, and having the pointed lower end, and tapering in an easy curve to a forwardly-projecting cutting-edge *b* at one side, as set forth.

HARVEY N. TIMMS.

Witnesses:
T. S. E. DIXON,
PLINY B. SMITH.